United States Patent
Laverdant

[15] 3,638,763
[45] Feb. 1, 1972

[54] MECHANICAL ACTUATING MECHANISM FOR DISC BRAKE

[72] Inventor: Bernard Laverdant, Vincennes, France
[73] Assignee: Societe Anonyme D.B.A.
[22] Filed: Apr. 22, 1970
[21] Appl. No.: 30,726

[30] Foreign Application Priority Data

Apr. 22, 1969 France..................................6912597

[52] U.S. Cl...........................188/72.6, 188/71.9, 188/72.7, 188/106 F
[51] Int. Cl.........................................................F16d 55/26
[58] Field of Search......................188/71.8, 71.9, 72.6, 72.7, 188/72.9, 106 F

[56] References Cited

UNITED STATES PATENTS

| | | | |
|---|---|---|---|
| 3,243,016 | 3/1966 | Swift | 188/72.7 X |
| 3,344,891 | 10/1967 | Thirion | 188/72.7 X |
| 3,392,807 | 7/1968 | Sommers | 188/72.7 X |
| 3,443,670 | 5/1969 | Margetts | 188/72.6 X |

FOREIGN PATENTS OR APPLICATIONS 1,317,919  1/1963  France...................................188/71.9

Primary Examiner—George E. A. Halvosa
Attorney—W. N. Antonis and Plante, Arens, Hartz and O'Brien

[57] ABSTRACT

A parking actuator for a disc brake is disclosed which includes a pair of relatively rotatable actuating members. Oppositely facing recesses having inclined sides are provided in each of the members, and force-transmitting elements are received in these recesses. One of the members carries a nut which advances into engagement with the actuating piston of the brake when the one member is rotated relative to the brake housing. When a parking application is effected, the one member is first rotated relative to the housing to move the nut into engagement with the piston, whereupon the other member is rotated relative to the one member to drive the force-transmitting elements up the sides of the recesses to urge the one member and the piston in a brake-applying direction.

4 Claims, 4 Drawing Figures

PATENTED FEB 1 1972    3,638,763
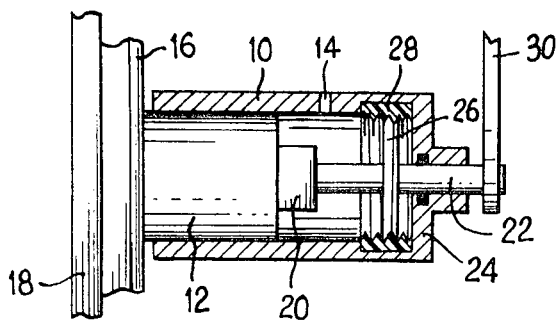
Fig.1
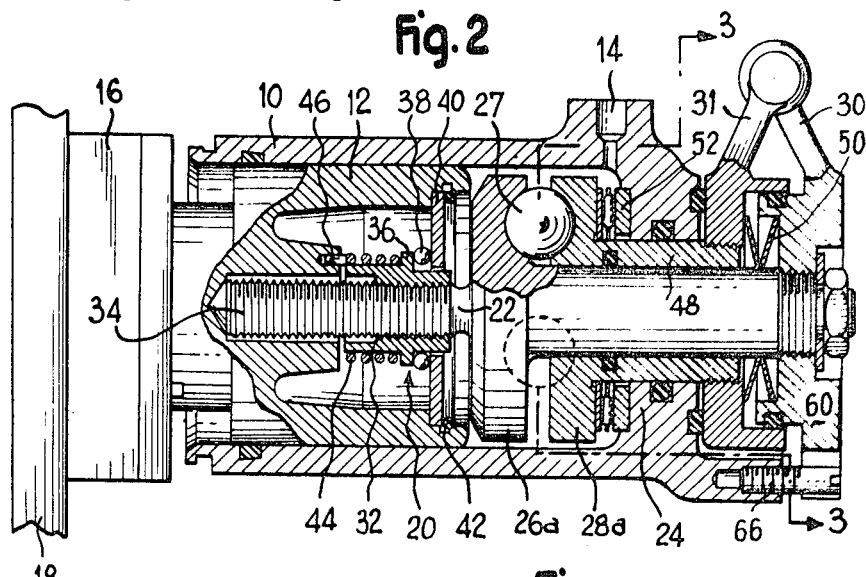
Fig.2
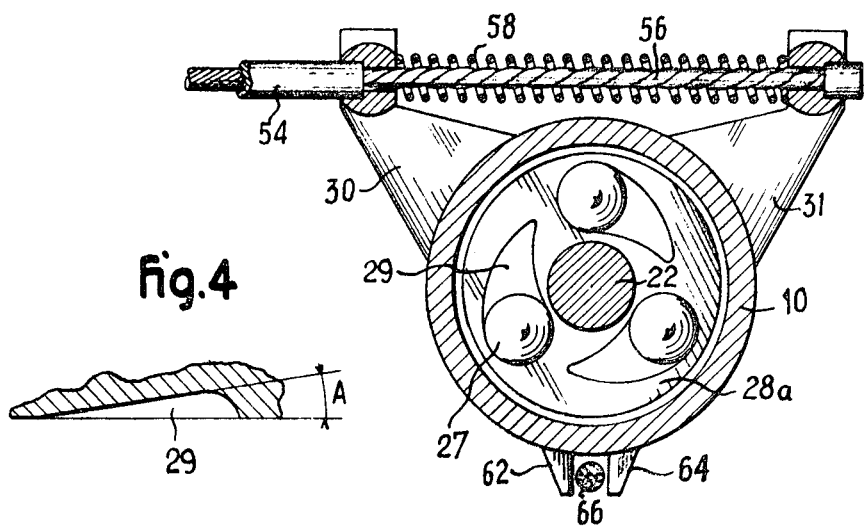
Fig.3
Fig.4

MECHANICAL ACTUATING MECHANISM FOR DISC BRAKE

This invention relates to a mechanical actuating mechanism for a disc brake.

There has already been proposed for mechanically applying at least one of the pads of a disc brake against the disc of the latter, to use a screw cooperating with stirrup or the fixed support, the rotation of which is caused by a lever. When such a screw is used, the latter acts against the pad which is not adjacent to the hydraulic cylinder of the brake provided in a sliding stirrup or directly on the pad adjacent the cylinders in the central portion of said pad, between the two hydraulic cylinders in the case of a brake comprising two cylinders located side by side.

It has also been proposed to clamp one of the pads against the disc by interposition of a device including ramps and balls located between the pad and the piston which permits providing inside of the cylinder an adjusting device. Such a brake control mechanism is described in French Pat. No. 1,475,625 to applicant.

The above prior devices present drawbacks in that the mechanisms comprising screws or balls and ramps are out of the cylinder and have to be protected by means such as a boot or the like. On the other hand, when such mechanisms are provided between the piston and the pad adjacent thereto, they result in a substantial increase of the axial overall size of the stirrup posing technical problems of mechanical strength.

According to the invention there is provided a mechanical actuating mechanism for a disc brake of the type comprising a piston slidably mounted in a hydraulic cylinder for applying a pad adjacent thereto against a disc, an automatic adjuster located between said piston and a rod cooperating with the bottom of the cylinder characterized in that said rod is provided with inclined or helical ramp-forming means provided between said piston and said bottom and cooperating with other inclined or helical ramp-forming means cooperating with said cylinder or with the bottom thereof, the relative rotational movement of the aforesaid ramp means causing the advance toward the disc of the structure comprising the rod, the automatic adjuster, the piston and the pad.

It will be understood that with such an arrangement the above-mentioned drawbacks are avoided since the control mechanism comprising balls and ramps or screw is located on the rear side of the control piston in the body of the hydraulic cylinder.

In a preferred embodiment of the instant application, the invention applies to a disc brake as described in French Pat. No. 1,317,919 to applicant in which the adjuster consists of a clutch-forming assembly including an internally threaded sleeve and an helical spring wound around said sleeve, said clutch assembly being provided between a threaded rod cooperating with the bottom of the cylinder and the piston. In this last-named French patent, there has been proposed two mechanical control means of the brake comprising such an adjuster; in the first means the rod is pushed by a cam and in the second the threaded rod is rotated by a lever located outside of the cylinder. Such lever transmits a control force to the rod and to the piston through the intermediary of the threaded sleeve which is thus locked on the piston through the clutch spring. These two mechanical control means are satisfactory in the case of light vehicles but one can easily understand that the control means comprising a cam pushing against the rod or the control means including a lever rotating the rod cooperating by a long pitch threaded portion with a sleeve cannot be satisfactory in the case of heavy vehicles in view of the friction forces involved.

The invention thus proposes a mechanical control for a brake as defined hereinabove in which the wear-taking automatic adjuster comprises a sleeve threadedly mounted with play on a reversible threaded portion provided at the end of the rod and cooperating in abutment with the bottom of the piston, the rotation of the sleeve in the direction corresponding to the backward movement of the piston in the cylinder being impeded by clutch means comprising a helical spring wound on said sleeve and having an end anchored on said piston. Between the bottom of the cylinder and the piston, the rod is provided with a flanged portion having inclined ramps cooperating through the intermediary of balls, with other ramps made in a washer applied against said bottom, means being provided to rotate said washer relatively with respect to said flanged portion.

It can be understood that with such structure it is possible to obtain a combined motion of the rod when the threaded portion is first advanced in the sleeve and subsequently when the balls are climbing their inclined ramps. The second step of the motion of the rod can be effected with a reduced pitch resulting in a substantial multiplication of effort.

The invention will be now described by way of examples with reference to the accompanying drawings in which:

FIG. 1 is a diagrammatic view of a wheel cylinder comprising an automatic wear-taking adjuster including a mechanical actuating device according to the invention;

FIG. 2 is an axial cross section of a wheel cylinder comprising a mechanical actuating device according to a preferred embodiment of the invention;

FIG. 3 is cross section along line 3—3 of FIG. 2; and

FIG. 4 is a cross section along one of the ramp-forming cavities shown in FIG. 3.

In FIG. 1 there is shown diagrammatically a wheel cylinder in the body of which is slidably mounted piston 12 which upon application of fluid pressure admitted through a port 14 urges a pad 16 against a disc 18. Behind piston 12 is provided a wear-taking device 20 of the unidirectional type permitting the piston 12 to advance toward the disc 18 and opposing the movement of said piston in the opposite direction beyond a very small displacement corresponding to a given manufacturing play. In the shown device, the wear-taking device 20 cooperates with the piston 12 and with a rod 22 which cooperates with the bottom 24 of the housing 10 so as to be able to advance toward the disc under the action of an internal force and to be unable to move backwards toward the interior upon actuation of the wear-taking device. According to the invention, there has been provided on rod 22 between the device 20 and the bottom 24 of the cylinder, a threaded cylindrical portion 26 having a small pitch threaded surface cooperating with the internal threaded surface of a sleeve 28 nonrotatably mounted with respect to housing 10. One understands that the rotation in the suitable direction of a lever 30 carried by rod 22 will cause the rod to advance towards the disc together with the adjuster 20, the piston 12 and the pad 16 thus causing a mechanical application of the brake. Of course, instead of the threaded cylindrical portion 26 and sleeve 28, it is possible to use a flange provided with cavities having ramps cooperating with balls cooperating with corresponding cavities also provided with ramps provided in the bottom 24 or in a part applied against said bottom and adapted to rotate with respect to the flange. It should be also noted that there has been provided to rotate the rod 22, but that in certain cases by use of a suitable means such as, for instance, a tubular member coaxial tube to rod 22, it will be possible to rotate the sleeve 28 relative to the threaded cylindrical portion 26. Of course, with the device described hereinabove, in view of the provision of a small pitch threaded surface or of ramps having a small slope to cooperate with the balls, the rotation of lever 30 permits obtaining a very efficient clamping force to urge a pad 16 against the disc 18.

It should also be noted that it is possible to provide between the sleeve 28 and the cylinder 26 a series of adjacent balls with a view to substantially reduce the friction forces.

In FIGS. 2 and 3 there is shown a preferred embodiment of the invention applied to a wheel cylinder comprising an adjusting device of the type described in French Pat. No. 1,317,919 in the name of applicant. In FIGS. 2 and 3 the same reference numerals are used to designate parts that are similar to those of FIG. 1. In a housing 10 is slidably mounted, but nonrotatably, a piston 12 which, when subjected to a fluid pressure admitted through port 14 urges a pad 16 against a disc 18. There is also shown a wear-taking device or adjuster 20 which will be described in detail thereafter. The adjuster 20 is mounted between the piston 12 and a rod 22 passing through the bottom 24 of housing 10 and which is adapted to be rotated by a lever 30 solid with the end of rod 22.

The adjuster 20 comprises an internally threaded sleeve 32 screwed on a long pitch threaded end 34 of rod 22 which projects into an axial passage provided in piston 12. Sleeve 32 is provided with a radial flange 36 in abutment against a thrust ball bearing 38 cooperating with a washer 40 maintained against the edge of piston 12 by a resilient ring 42. On sleeve 32 is wound a helical spring 44, one end of which is anchored in piston 12.

Rod 22 passes through the bottom 24 of the cylinder housing and comprises at its outer end a lever 30 solid therewith. The rod 22 comprises between the rear portion of piston 12 and the bottom 24 of the cylinder a flanged portion 26a in which are provided three cavities having inclined ramps and receiving balls 27. Balls 27 are also received in corresponding cavities provided in a washer 28a solid with a tubing 48 coaxial with rod 22 and integral with lever 31.

FIG. 4 is a cross-sectional view of one of the above cavities 29, the apex angle "A" of the ramp of the cavity is of about 10° but it can, of course, be larger or smaller and it is possible to contemplate the use of a variable slope.

Belleville washers 50 are mounted on rod 22 to urge the flanged portion 26a of rod 22 and washer 28a carried by a tubular member 48 one toward the other to squeeze balls 27.

The assembly comprising the flange portion, the washer and the intermediary balls is applied against the bottom 24 by the Belleville washers 50 and a needle thrust bearing 52 is located between said bottom and the washer 28a to reduce the friction forces during the rotation.

The levers 30 and 31 are located at an angle which may be comprised between 60° and 120° and their free ends are adapted to be moved toward the other by control means comprising a tubing 54 one end of which is in abutment against the end of lever 30 and a cable 50 slidably mounted in said tubing the end of which is connected to the free end of lever 31. A compression spring 58 is slipped on the cable between the ends of levers 30 and 31. A disc 60 constituting the body of lever 30 which is solid with rod 22 comprises a forked portion made of two radially extending fingers 62 and 64 adapted to abut a screw 66 solid with housing 10 with a view to limiting the angular displacements of said lever 30 to a few degrees whereas the rotation of levers 31 is not restricted.

The operation of the mechanical brake control of FIGS. 2 and 3 will be now described.

The sliding motion of the cable 56 in its tubing 54 against the friction forces and the return spring 58 causes the rotation in an opposite direction of levers 30 and 31 which come closer to each other. These levers drive in rotation to flange 26a and washer 28a respectively.

In a first operating step executed with a slight effort, the two levers substantially rotate of the same angular value. The rotation of the threaded rod 22 would normally cause rotation, in the same direction, of sleeve 32, but the latter is urged in a direction of rotation which is impeded by its helical spring 44 and since it cannot rotate, it moves and takes up the operation play until it is brought in abutment against piston 12. Because of the long pitch of the helical splines between the threaded portion 34 and the internally threaded sleeve 32, the necessary axial displacement only necessitates a small angular motion of lever 30 solid with the rod 22 carrying the threaded portion 34.

After having brought sleeve 32 in abutment against piston 12, the threaded portion 34 of the rod can no longer rotate in view of the fact that said piston 12 is nonrotatably mounted with respect to the pad assembly. Thus, begins the second step of the mechanical braking operation which may be called "working stroke" when compared with the first step which can be called "play taking-up stroke." The rod 22 carrying the threaded portion 34 being brought to a standstill as well as its control lever 30, the cable only causes the rotation of lever 31 and disc 28a solid therewith. When the rotating disc 28a causes the balls to climb on their ramps in the respective cavities, washer 28a being applied against the bottom 24 of the housing through the intermediary of the needle bearing 52.

The tangential effort applied to lever 31 is converted into an amplified axial effort transmitted by the threaded portion 34 of rod 22 to piston 12 through the intermediary of the sleeve 32 locked on said threaded portion.

The finger 64 is in abutment against the screw 66 solid with housing 10 which permits avoiding the transmission of an exaggerated torque to the sleeve 32 and threaded portion 34 connected by rod 22. Furthermore, the abutment between finger 64 and screw 66 is compulsory during the hydraulic operation of the brake which tends to rotate both levers by reaction. Thanks to the provision of two fingers 62 and 64 extending symmetrically on both sides of the screw 64 there is obtained a good positioning of the levers with respect to the cable control means and there is thus avoided any risk of unsetting the wear-taking device further to an improper motion of levers 30 and 31. When it is desired to reset to zero the adjusting device, for instance, further to replacement of the pads assemblies, no special tooling is necessary and it suffices to disconnect the cable and its tubing, and further to the dismounting of screw 66, to rotate both levers 30 and 31 in a direction corresponding to screwing the threaded portion 34 into sleeve 32 to cause the inward motion of piston 12 in cylinder 10.

What is claimed is:

1. In a disc brake:
  a rotor having a pair of friction faces;
  a pair of friction elements, one of said friction elements being disposed adjacent each of said friction faces;
  a torque member;
  a caliper slidably mounted on said torque member and operatively engaging each of said friction elements for urging the latter against their corresponding friction faces when a brake application is effected;
  said caliper including a housing defining a bore therewithin;
  a piston slidably mounted in said bore for urging said friction elements against said friction faces;
  a pair of actuating members within said bore and rotatable relative to one another, each of said members being rotatable relative to said housing;
  each of said members having a portion extending parallel to a corresponding portion of the other member, each of said portions having recesses therein having inclined sides and facing a corresponding recess in the other member, said corresponding recesses receiving a force-transmitting element;
  one of said members carrying means normally spaced a predetermined distance from said piston, but advancing relating to said one member into engagement with said piston when said one member is rotated relative to said housing; and
  operating means for operating said actuating means, said operating means initially rotating said one member relative to said housing until the means carried by said one member engages said piston, whereupon said operating means rotates the other member relative to the one member to drive said force-transmitting elements up said inclined sides to urge said one member toward said piston and away from said other member, thereby driving said piston toward the rotor to urge said fiction elements into braking engagement with their corresponding friction faces.

2. The invention of claim 1:
  said one member having a threaded portion, said means carried by said one member being a nut threadedly engaging said threaded portion; and
  means preventing rotation of said nut when said one member is rotated.

3. The invention of claim 1; and stop means limiting rotation of said one member to a predetermined arc.

4. The invention of claim 1:

said operating means including a pair of levers, one of said levers extending from each of said actuating members, a cable operatively connected to each of said levers for actuating the latter, and resilient means yieldably urging said levers apart.

* * * * *